United States Patent
Suarez et al.

(10) Patent No.: US 11,445,017 B2
(45) Date of Patent: Sep. 13, 2022

(54) MAINTAINING USER DATA AND METADATA CONSISTENCY IN AN ASYNCHRONOUS REPLICATION ENVIRONMENT

(71) Applicant: International Business Machines Corporation, Armonk, NY (US)

(72) Inventors: Jeffrey R. Suarez, Tucson, AZ (US); Nadim P. Shehab, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/282,026

(22) Filed: Feb. 21, 2019

(65) Prior Publication Data
US 2020/0274925 A1    Aug. 27, 2020

(51) Int. Cl.
*H04L 67/1095* (2022.01)
*G06F 3/06* (2006.01)
*G06F 16/11* (2019.01)
*G06F 9/54* (2006.01)

(52) U.S. Cl.
CPC ........ *H04L 67/1095* (2013.01); *G06F 3/0617* (2013.01); *G06F 3/0647* (2013.01); *G06F 3/0685* (2013.01); *G06F 9/542* (2013.01); *G06F 16/119* (2019.01)

(58) Field of Classification Search
CPC ... H04L 67/1095; G06F 3/0647; G06F 9/542; G06F 16/119; G06F 3/0617; G06F 3/0685
USPC ........................................................ 709/203
See application file for complete search history.

(56) References Cited

U.S. PATENT DOCUMENTS

| | | | | |
|---|---|---|---|---|
| 6,094,681 A * | 7/2000 | Shaffer | ................ | G06Q 10/10 709/206 |
| 6,324,654 B1 * | 11/2001 | Wahl | ................ | G06F 11/2066 707/999.202 |
| 6,453,334 B1 * | 9/2002 | Vinson | ................ | G06F 9/445 709/203 |
| 7,007,083 B1 * | 2/2006 | Chesley | ............. | H04L 12/1822 709/206 |

(Continued)

FOREIGN PATENT DOCUMENTS

| CN | 102790801 A | 11/2012 | | |
|---|---|---|---|---|
| EP | 0797796 B1 * | 12/1998 | ........... | G06F 3/1462 |

OTHER PUBLICATIONS

Rohaly et al., "SAS® Grid Manager I/O: Optimizing SAS® Application Data Availability for the Grid," SAS Institute Inc., Paper 1559-2014, 2014, pp. 1-14.

(Continued)

*Primary Examiner* — Umar Cheema
*Assistant Examiner* — John Fan
(74) *Attorney, Agent, or Firm* — Zilka-Kotab, P.C.

(57) ABSTRACT

A computer-implemented method includes determining that an update to data on a local computer has been initiated by an application and sending a notification to a remote computer that the update has been initiated. The method includes sending, to the remote computer, an indication of the data on the local computer being updated. The method includes, in response to determining that updates to the data on the local computer and meta data corresponding to the data have been completed, sending a second notification to the remote computer that the update has been completed.

17 Claims, 6 Drawing Sheets

(56) References Cited

U.S. PATENT DOCUMENTS

| | | | |
|---|---|---|---|
| 8,255,649 B2 | 8/2012 | Hiraiwa et al. | |
| 9,063,945 B2 | 6/2015 | Benhase et al. | |
| 9,170,743 B2 | 10/2015 | Deguchi | |
| 2003/0187964 A1* | 10/2003 | Sage | G06F 16/951 709/221 |
| 2009/0292709 A1* | 11/2009 | Tsinman | G06F 9/466 |
| 2011/0066592 A1* | 3/2011 | Newport | G06F 16/273 707/615 |

OTHER PUBLICATIONS

Dell EMC, "ECS High Availability Design," Dell Inc., White Paper, Mar. 2018, pp. 1-53.

Anonymous, "Method to improve remote copy bandwidth utilization by only mirroring byte level changes," IP.com Prior Art Database, Technical Disclosure No. IPCOM000219530D, Jul. 5, 2012, 7 pages.

Anonymous, "A method to recover from a RAID rebuild failure on the fly," IP.com Prior Art Database, Technical Disclosure No. IPCOM000234059D, Jan. 9, 2014, 9 pages.

Anonymous, "A method to mirror host new modified data with minimum storage space for remote copy suspension," IP.com Prior Art Database, Technical Disclosure No. IPCOM000235428D, Feb. 27, 2014, 6 pages.

Pinder, S., "Synchronous vs asynchronous replication: Order of events during data writes," ComputerWeekly.com, Apr. 2011, 6 pages, retrieved from https://www.computerweekly.com/answer/Synchronous-vs-asynchronous-replication-Order-of-events-during-data-writes.

Westphal et al., "DS8000 Copy Services," IBM Redbooks, International Technical Support Organization, Mar. 2017, 612 pages, retrieved from http://www.redbooks.ibm.com/redbooks/pdfs/sg248367.pdf.

* cited by examiner

MAINTAINING USER DATA AND METADATA CONSISTENCY IN AN ASYNCHRONOUS REPLICATION ENVIRONMENT

BACKGROUND

The present invention relates to disaster recovery, and more specifically, this invention relates to asynchronous data replication.

In conventional disaster recovery storage systems, data is written to a local computer in real-time so that it can be used, and at some later time, preferably in as short a time as is feasible given the system constraints, the data is transferred from the local computer to a remote computer. Data that is written to the remote computer is written in the same order as at the local computer, thereby ensuring that changes are properly reflected in the remote computer as they are made in the local computer.

If data is written out of order on the remote computer, and a disaster occurs which renders the data on the local system unusable, the data at the remote computer is preferably consistent with the (now lost) data on the local computer. In order to prevent inconsistencies between the local computer and the remote computer, updates to data must be regularly made to both sites. For example, if four transactions (T1, T2, T3, and T4) take place on a piece of data on the local computer, and if one of the transactions is missed, e.g., only T1, T2, and T4 are stored to the corresponding data on the remote computer, an attempt to recover the data from the remote computer would render data that is inconsistent with what exists on the local computer. However, a data comparison utility may have difficulties identifying which data and/or which type of data comprises the inconsistency.

SUMMARY

A computer-implemented method, according to one approach, includes determining that an update to data on a local computer has been initiated by an application and sending a notification to a remote computer that the update has been initiated. The method includes sending, to the remote computer, an indication of the data on the local computer being updated. The method includes, in response to determining that updates to the data on the local computer and meta data corresponding to the data have been completed, sending a second notification to the remote computer that the update has been completed. The method provides the benefit of enabling a user and/or data comparison system to determine whether a remote computer comprises a complete version of the updates made on the local computer and/or whether the remote computer comprises a mid-process version of the updates made on the local computer.

The computer-implemented method may optionally include sending the indication of the data on the local computer being updated to the remote computer before the update of the data on the local computer is completed. This operation provides the benefit of enabling a user and/or data comparison system to determine what data and/or what type of data is inconsistent and/or determining whether any inconsistencies are related to user data and/or meta data.

A computer-implemented method, according to one approach, includes receiving a notification at a first computer that an update to data on a second computer has been initiated and receiving, at the first computer, an indication of the data on the second computer being updated. The method also includes receiving a second notification at the first computer that updates to the data on the second computer and meta data corresponding to the data have been completed. The computer-implemented method provides the benefit of enabling a user and/or data comparison system to determine whether a true mirror of the data exists on the remote computer and/or whether there are any pieces of user data and/or meta data outstanding.

The method may optionally include receiving by the first computer the indication of the data on the second computer being updated before the data on the second computer is updated. This operation provides the benefit of enabling a user and/or data comparison system to determine what data and/or what type of data is inconsistent and/or determining whether any inconsistencies are related to user data and/or meta data.

A computer program product for providing communication between local and remote computers, according to one approach, includes a computer readable storage medium having program instructions embodied therewith. The program instructions are executable by the computer. The program instructions cause the computer to determine that an update to data on a local computer has been initiated by an application and send a notification to a remote computer that the update has been initiated. The program instructions cause the computer to send, to the remote computer, an indication of the data on the local computer being updated. The program instructions cause the computer to, in response to determining that updates to the data on the local computer and meta data corresponding to the data have been completed, send a second notification to the remote computer that the update has been completed. The computer program product improves remote copy performance by providing a notification to prevent subsystems from flagging a copy mis-compare in situations where the copy has not completed at the remote computer.

The computer program product may optionally include sending the indication of the data on the local computer being updated to the remote computer while the data on the local computer is being updated. This operation provides the benefit of enabling a user and/or data comparison system to determine what data and/or what type of data is inconsistent and/or determining whether any inconsistencies are related to user data and/or meta data.

Other aspects and approaches of the present invention will become apparent from the following detailed description, which, when taken in conjunction with the drawings, illustrate by way of example the principles of the invention.

DETAILED DESCRIPTION

Figure 1:
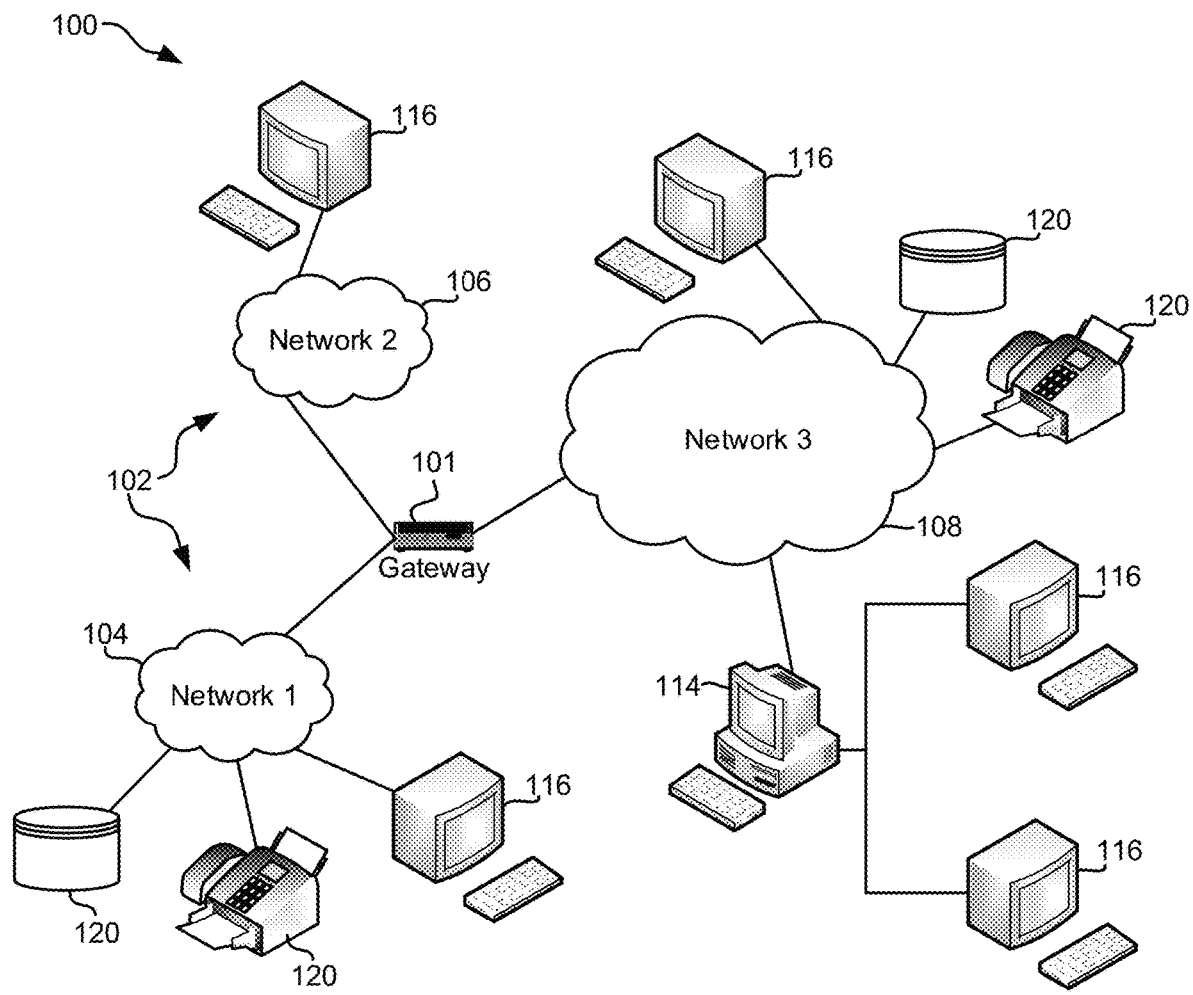
FIG. 1 illustrates a network architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for consistent asynchronous data replication.

In one general approach, a computer-implemented method includes determining that an update to data on a local computer has been initiated by an application and sending a notification to a remote computer that the update has been initiated. The method includes sending, to the remote computer, an indication of the data on the local computer being updated. The method includes, in response to determining that updates to the data on the local computer and meta data corresponding to the data have been completed, sending a second notification to the remote computer that the update has been completed.

In another general approach, a computer-implemented method includes receiving a notification at a first computer that an update to data on a second computer has been initiated and receiving, at the first computer, an indication of the data on the second computer being updated. The method also includes receiving a second notification at the first computer that updates to the data on the second computer and meta data corresponding to the data have been completed.

In another general approach, a computer program product for providing communication between local and remote computers includes a computer readable storage medium having program instructions embodied therewith. The program instructions are executable by the computer. The program instructions cause the computer to determine that an update to data on a local computer has been initiated by an application and send a notification to a remote computer that the update has been initiated. The program instructions cause the computer to send, to the remote computer, an indication of the data on the local computer being updated. The program instructions cause the computer to, in response to determining that updates to the data on the local computer and meta data corresponding to the data have been completed, send a second notification to the remote computer that the update has been completed.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
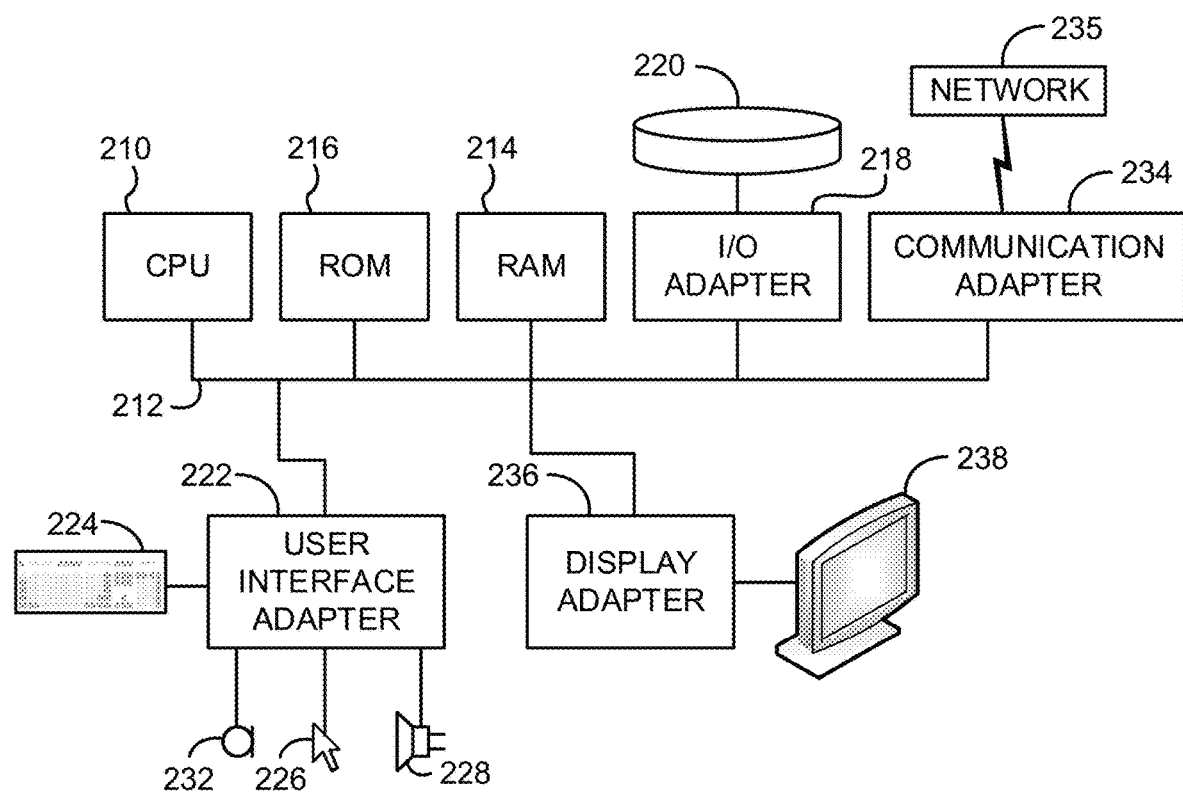
FIG. 2 shows a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
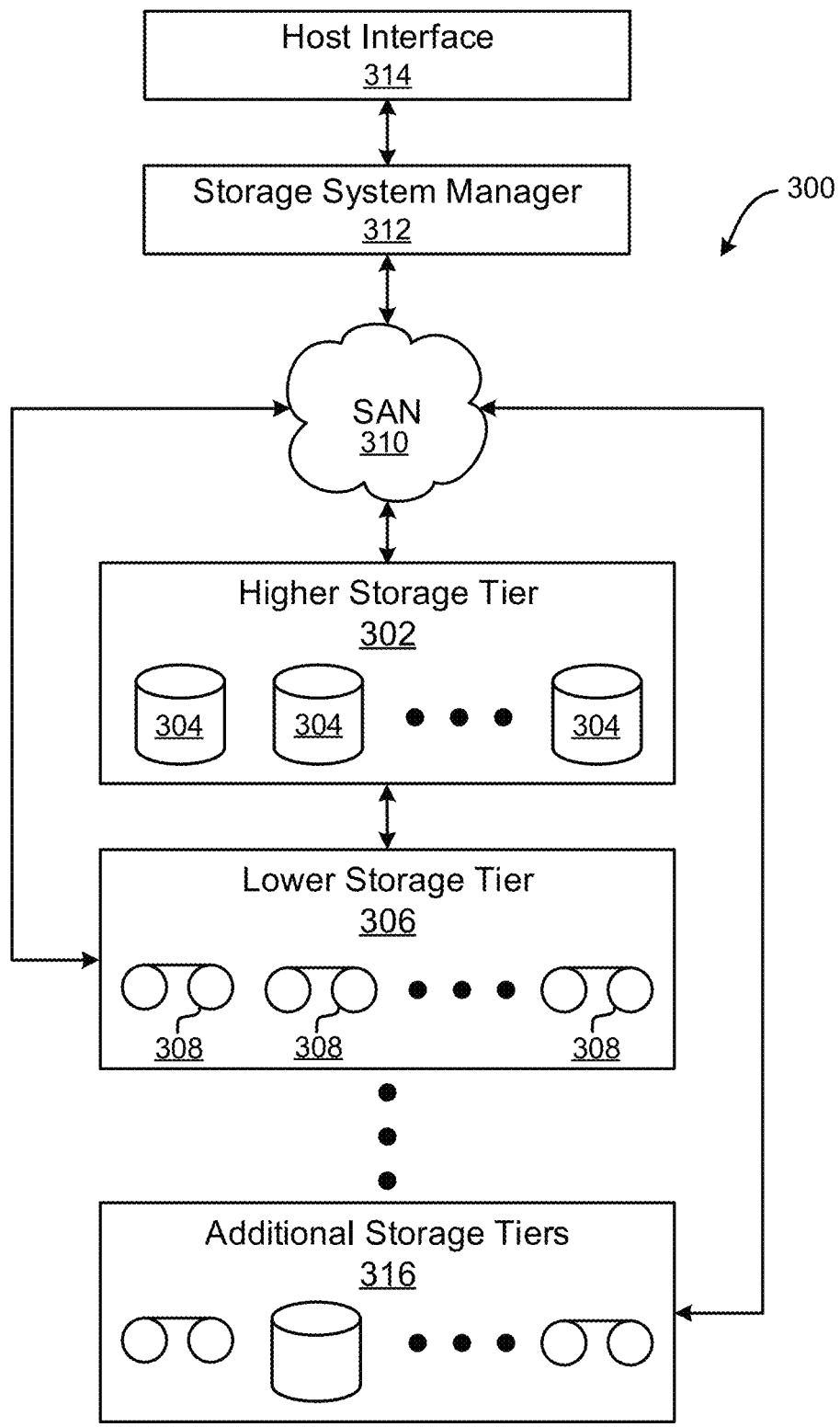
FIG. 3 illustrates a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

Various asynchronous data replication techniques provide data replication to a remote site which may be independent from application write I/O processing at the primary site. Independent data replication results in relatively little to no impact to the application write I/O response time. Data currency at the remote site often lags behind the local site. Lag times vary depending on network bandwidth, distance between sites, storage system configurations, peak write workload times, link bandwidth utilization, etc. An asynchronous data replication system may lose data in transit and/or data still in the queue at the primary site (e.g., the local site) which was waiting to be replicated to the remote site (e.g., the backup site).

Conventional asynchronous data replication environments include an application write I/O process comprising writing application data to the local storage system cache, acknowledgement of a successful I/O to the application, replicating the data from the local storage system cache to the remote storage system cache, and acknowledgement of successful data arrival from the local storage system to the remote storage system. Data which is ready to be copied to a remote site using conventional asynchronous replication techniques is not immediately available at the remote site.

Asynchronous replication may occur while updates are made to an application on a local site. The application updates may comprise true user data and/or meta data corresponding to the data which is updated to the application. The type of data that may be copied to the remote size varies. Consistency of user data on the local site and the remote site may not be complete until meta data updates have been made on both the local site and the remote site. Conventional asynchronous solutions do not send meta data updates with the user data updates to the remote site. Context for user data updates is lacking in conventional asynchronous data replication environments because the replication is unable to distinguish between the user data and the meta data. For example, as tracks are updated via applications, meta data is later separately updated to reflect the user data updates.

Meta data on count key data (CKD) devices exists on the Volume Table of Contents (VTOC), the Virtual Storage Access Method (VSAM) Volume Data Set (VVDS), and/or Integrated Catalog Facility (ICF) catalogs. Meta data updates reflect attributes of the data set on the volume(s), records on a track, number of bytes used on a track, a last track used for a number of records, etc. A consistency point may be reached when the meta updates and the user data are updated. However, a conventional approach for determining a state of consistency for a data set is not available because user data and meta data updates are not done at the same time.

Utilities such as XRC Dynamic Volume Compare (DVC) may validate replication by comparing track data to determine whether inconsistencies exist between local and remote sites. Determining what data and/or what type of data is inconsistent is difficult for such utilities, especially determining whether any inconsistencies are related to user data and/or meta data. Data set comparison tools may validate replicated data for additional expenses (e.g., I/O, time, cost, etc.).

Figure 4:
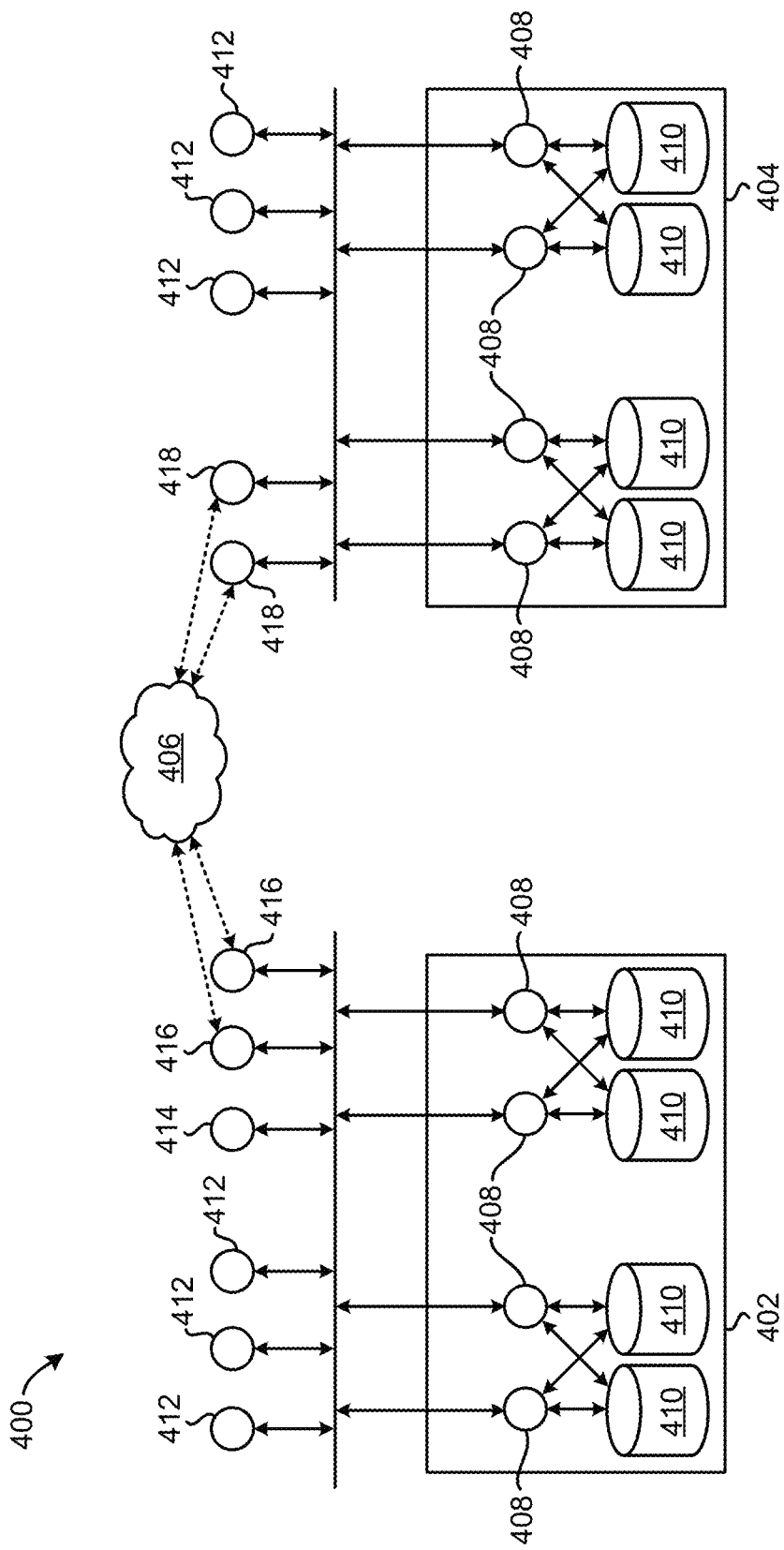
FIG. 4 is a partial representational view of a distributed storage system in accordance with one approach.

Looking to FIG. 4, a distributed storage system 400 is illustrated in accordance with one approach. As an option, the present storage system 400 may be implemented in conjunction with features from any other approach listed herein, such as those described with reference to the other FIGS. However, such storage system 400 and others presented herein may be used in various applications and/or in permutations which may or may not be specifically described in the illustrative approaches listed herein. Further, the storage system 400 presented herein may be used in any desired environment. Thus FIG. 4 (and the other FIGS.) may be deemed to include any possible permutation.

As shown, the distributed storage system 400 includes a local computer 402 and a remote computer 404 which are connected by a network 406.

The network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the local computer 402 and the remote computer 404 are able to communicate with each other regardless of the amount of separation which exists therebetween, e.g., despite being positioned at different geographical locations.

Both the local computer 402 and the remote computer 404 include a number of data access nodes 408 which are coupled to various data storage devices 410. In some approaches, one or more of the data access nodes 408 serve as virtual machines which provide access to data stored in the distributed storage system 400. Thus, various ones of the data access nodes 408 may implement (e.g., run) any number of applications. According to an illustrative approach, which is in no way intended to limit the invention, one or more of the data access nodes 408 serve as a migration client which issues read operations, write operations, update operations, etc. received from a user and/or application being run thereby.

Moreover, in some approaches, each of the data storage devices 410 at each of the respective sites 402, 404 is of a same type of storage, e.g., SSD, HDD, magnetic tape, etc. According to an illustrative example, each of the data storage devices 410 at the local computer 402 include SSDs, while each of the data storage devices 410 at the remote computer 404 include HDDs. However, in other approaches the various storage devices 410 at either of the respective sites may include more than one different type of storage.

Each of the data access nodes 408 is also in communication with several different node types. For instance, data access nodes 408 at both the local computer 402 and the remote computer 404 are coupled to a plurality of compute nodes 412. Looking specifically to the local computer 402, the compute nodes 412 may currently be running one or more applications. Each of these compute nodes at the local computer 402 is also coupled to a master gateway node 414 which in turn is coupled to more than one different worker gateway node 416. It follows that in some approaches the compute nodes 412 send I/O operations which are executed at the local computer 402 (e.g., by the storage nodes 408) to the master gateway node 414 using any desired remote procedure call (RPC).

Once the I/O operations are sent to the master gateway node 414, the compute nodes 412 at the local computer 402 return to performing the respective applications being performed thereon. However, the master gateway node 414 stores the asynchronous data replication operations received form the compute nodes 412 in a queue. Accordingly, although now shown in FIG. 4, the master gateway node 414 includes a queue in some approaches. The queue may manage the received operations according to any desired structure. For instance, in some approaches the queue processes the operations received in a first-in-first-out (FIFO) manner. However, in other approaches the queue processes the operations received in a last-in-first-out (LIFO) manner.

With continued reference to FIG. 4, each of the worker gateway nodes 416 at the local computer 402 is paired (e.g., matched) with a corresponding I/O node 418 at the remote computer 404. Accordingly, asynchronous data replication operations which are queued at the master gateway node 414 can be distributed across the multiple worker gateway nodes 416, and then sent to the corresponding I/O nodes 418. Thus, the data replication operations are transferred from the local computer 402 to the remote computer 404 in an efficient manner which also actively avoids system crashes by distributing the processing load. The achievable throughput of the system is also increased as a result of implementing multiple worker gateway and I/O node pairs 416, 418 which are capable of sending data replication operations simultaneously and in parallel.

Upon receiving data replication operations, the I/O nodes 418 at the secondary site communicate with the data access nodes 408 such that data stored in the various storage devices 410 is updated accordingly. As a result, the remote computer 404 serves as a backup for the data stored at the local computer 402, e.g., for data retention purposes. Thus, any updates, deletes, overwrites, new writes, etc. performed at the local computer 402 and/or elsewhere in the distributed storage system 400 are reflected at the remote computer 404.

It should be noted that the approach illustrated in FIG. 4 may include more or fewer components depending on the desired approach. For instance, the system 400 includes one or more servers at each of the local and remote computers 402, 404 in some approaches. In some approaches, the data access nodes 408 may be coupled to a server using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the process of forming a communication link between any one or more of the data access nodes 408, a server (not shown), the compute nodes 412, the master gateway node 414, the worker gateway nodes 416, the I/O nodes 418, etc., may implement any protocols and/or processes which would be apparent to one skilled in the art after reading the present description.

Figure 5:
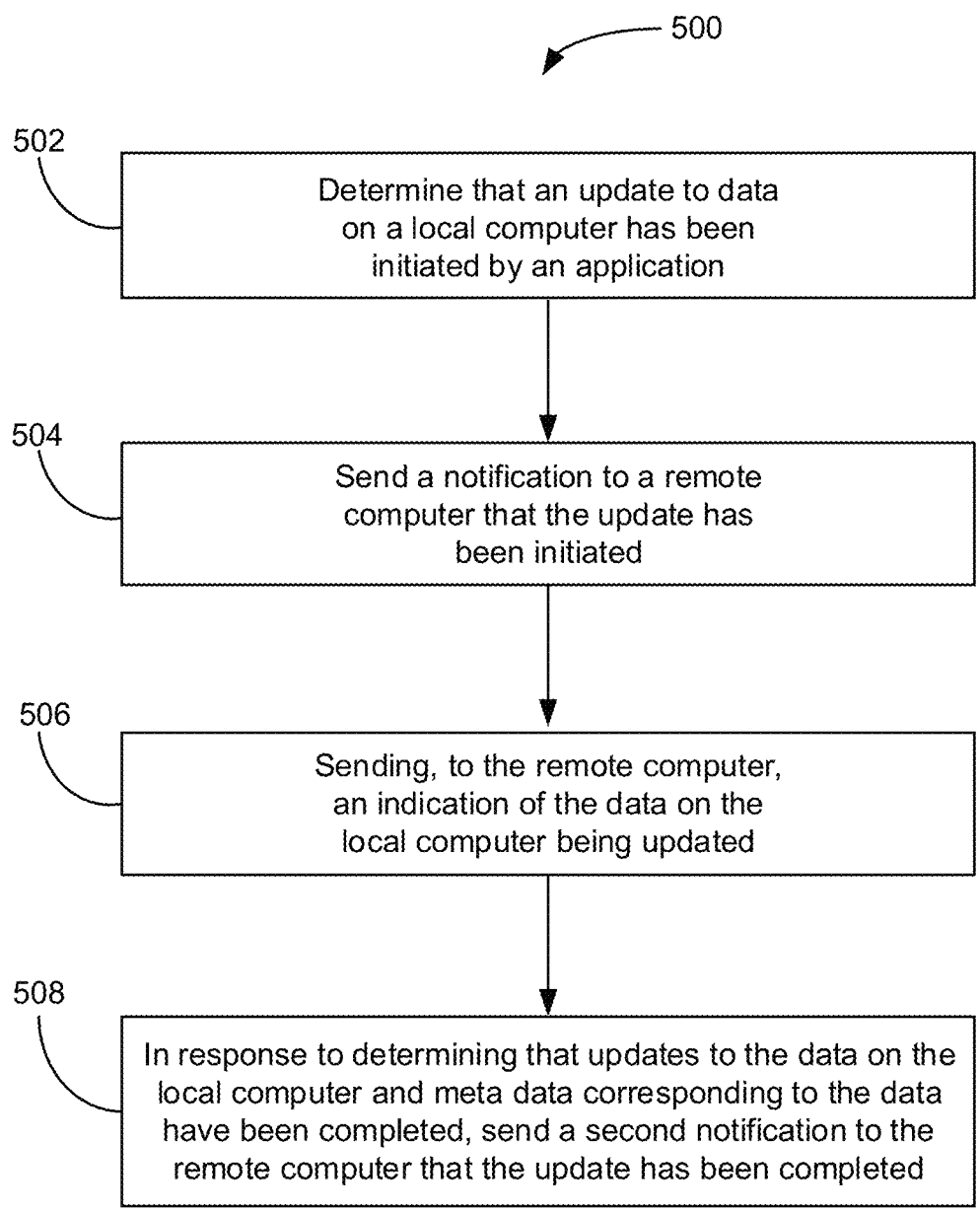
FIG. 5 is a flowchart of a method, according to one approach.

Now referring to FIG. 5, a flowchart of a method 500 is shown according to one approach. The method 500 may be performed in accordance with the present invention in any of the environments depicted in FIGS. 1-4 and 6, among others, in various approaches. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various approaches, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502 which comprises determining that an update to data on a local computer has been initiated by an application. A local computer as described herein may be interchangeably referred to as a primary site, a local site, a source site, etc. A "computer" may generally refer to any device comprising applications which generate data, update data, store data, manage data, etc. Moreover, a computer may include a deployment of more than one computer. An application may be any type of application, such as a word processing software application, desktop publishing software application, spreadsheet application, presentation application, media application, internet browser, email application, graphics program, communication application, etc.

In a preferred approach, the data on the local computer is asynchronously replicated on the remote computer. Various operations of method 500 may be performed in any asynchronous data replication environment known in the art, but modified to include the inventive concepts disclosed herein.

Operation 502 includes determining that an update to data on a local computer has been initiated by an application. Any technique known in the art may be used to make this determination. An update to data on a local computer may comprise adding data, removing data, changing data formatting, changing the form of the data, merging data sets, ranking data, etc.

Operation 504 includes sending a notification to a remote computer that the update has been initiated. A remote computer as described herein may be interchangeably referred to as a secondary site, a backup site, a recovery site, etc. and moreover may include a deployment of computers. In one approach, the notification to the remote computer includes an indication that updates have begun (e.g., started) and an indication of the data on the local computer being updated as described below in operation 506. The notification may be sent in any manner known in the art.

Operation 506 includes sending, to the remote computer, an indication of the data on the local computer being updated. In one approach, an indication may include attributes of one or more data sets on one or more volumes, records on a track, number of bytes used on a track, a last track used for a number of records, data which is being updated, the type of data being updated, the location of the data being updated, a data set name and/or identifier, etc. In one approach, the indication is a separate item from the notification to a remote computer that the update has been initiated as described above in operation 504. The indication may be sent in any manner known in the art.

In one approach, the indication of the data on the local computer being updated may be sent to the remote computer before the update of the data on the local computer is completed. For example, the indication of the data on the local computer being updated may identify which data set is being updated although the indication may not include the exact updates where the update is not completed.

In another approach, the indication of the data on the local computer being updated is sent to the remote computer before the data on the local computer is updated. For example, the indication of the data on the local computer being updated may identify which data set is being updated before any updates are made to the data on the local computer.

In yet another approach, the indication of the data on the local computer being updated is sent to the remote computer while the data on the local computer is being updated. For example, the indication of the data on the local computer being updated may identify which data set is being updated as updates are made to the data on the local computer.

In other approaches, the notification to the remote computer that the update to data on the local computer has been initiated and the indication of the data on the local computer being updated are sent at substantially the same time.

Operation 508 includes, in response to determining that updates to the data on the local computer and meta data corresponding to the data have been completed, sending a second notification to the remote computer that the update has been completed. A completed update may interchangeably refer to an update which has ended.

In one approach, once the user data and the meta data updates have been completed on the local computer, the local computer may send a second notification to the remote computer for a specific data set. In this approach, a remote computer may be notified as to which data is being updated and may determine what data may or may not be consistent user data and meta data. This ability improves remote copy performance by providing a notification to prevent subsystems from flagging a copy mis-compare in situations where the copy has not completed at the remote computer.

In various approaches, method 500 may include determining that a complete version of the updates to the data on the local computer and meta data corresponding to the data have been received at the remote computer. Determining that a complete version of the updates to the data on the local computer and meta data corresponding to the data have been received at the remote computer may include comparing the data and meta data in various locations, evaluating consistency points which may be verified by one or more notifications, comparing information derived from the indication(s) to the data and metadata, etc.

Various approaches of method 500 enable a user and/or data comparison system to determine whether a remote computer comprises a complete version of the updates made on the local computer and/or whether the remote computer comprises a mid-process version of the updates made on the local computer. A user and/or data comparison system may be able to determine whether a true mirror of the data exists on the remote computer and/or whether there are any pieces of user data and/or meta data outstanding. Various stages of the replication process may be marked as consistency points where the data is fully usable.

Figure 6:
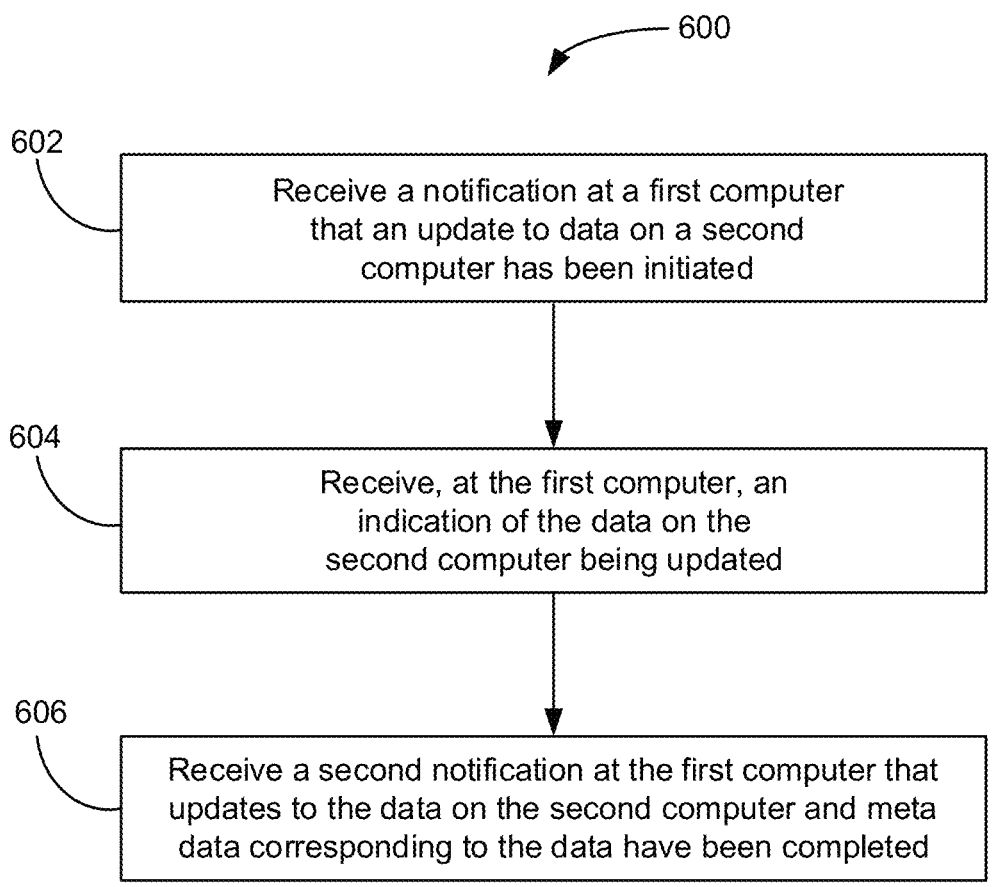
FIG. 6 is a flowchart of a method, according to one approach.

Now referring to FIG. 6, a flowchart of a method 600 is shown according to one approach. The method 600 may be performed in accordance with the present invention in any of the environments depicted in FIGS. 1-5, among others, in various approaches. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various approaches, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602 which comprises receiving a notification at a first computer that an update on data on a second computer has been initiated. In the context of the present method, a first computer may refer to a remote computer and a second computer may refer to a local computer. A first computer as described herein may be interchangeably referred to as a secondary site, a backup site, a recovery site, etc. A second computer as described herein may be interchangeably referred to as a primary site, a local site, a source site, etc. A "computer" may generally refer to any device comprising applications which generate data, update data, store data, manage data, etc. An application may be any word processing software application, desktop publishing software application, spreadsheet application, presentation application, media application, internet browser, email application, graphics program, communication application, etc.

In a preferred approach, the data on the second computer is asynchronously replicated on the first computer. Various operations of method 600 may be performed in any asynchronous data replication environment known in the art.

An update to data on a second computer may comprise adding data, subtracting data, changing data formatting, changing the form of the data, merging data sets, ranking data, etc.

In one approach, the notification to the first computer includes an indication that updates have begun (e.g., started) and an indication of the data on the second computer being updated as described below in operation 604. The notification may be received in any manner known in the art.

Operation 604 includes receiving, at the first computer, an indication of the data on the second computer being updated. In one approach, an indication may include attributes of one or more data sets on one or more volumes, records on a track, number of bytes used on a track, a last track used a number of records, data which is being updated, the type of data being updated, the location of the data being updated, a data set name and/or identifier, etc. In one approach, the indication is a separate item from the notification to a first computer that the update has been initiated as described above in operation 602. The indication may be received in any manner known in the art.

In one approach, the indication of the data on the second computer being updated may be sent to the first computer before the update of the data on the second computer is completed. For example, the indication of the data on the second computer being updated may identify which data set is being updated although the indication may not include the exact updates where the update is not completed.

In another approach, the indication of the data on the second computer being updated is sent to the first computer before the data on the second computer is being updated. For example, the indication of the data on the second computer being updated may identify which data set is being updated before any updates are made to the data on the second computer.

In yet another approach, the indication of the data on the second computer being updated is sent to the first computer while the data on the second computer is being updated. For example, the indication of the data on the second computer being updated may identify which data set is being updated as updates are made to the data on the second computer.

In other approaches, the notification to the first computer that the update to data on the second computer has been initiated and the indication of the data on the second computer being updated are received at substantially the same time.

Operation 606 includes receiving a second notification at the first computer that the updates to the data on the second computer and meta data corresponding to the data have been completed. A completed update may interchangeably refer to an update which has ended.

In one approach, the first computer may receive a second notification from the second computer for a specific data set. In this approach, a first computer may be notified which data is being updated and may determine what data may or may not be consistent user data and meta data. This ability improves remote copy performance by preventing subsystems from flagging a copy mis-compare in situations where the copy has not completed at the first computer.

In various approaches, method 600 may include determining that a complete version of the updates to the data on the second computer and meta data corresponding to the data have been received at the first computer. Determining that a complete version of the updates to the data on the second computer and meta data corresponding to the data have been received at the first computer may include comparing the data and meta data in various locations, evaluating consistency points which may be verified by one or more notifications, comparing information derived from the indication(s) to the data and metadata, etc.

Various approaches of method 600 enable a user and/or data comparison system to determine whether a remote computer comprises a complete version of the updates made on the local computer and/or whether the remote computer comprises a mid-process version of the updates made on the local computer. A user and/or data comparison system may be able to determine whether a true mirror of the data exists on the remote computer and/or whether there are any pieces of user data and/or meta data outstanding. Various stages of the replication process may be marked as consistency points where the data is fully usable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred approach should not be limited by any of the above-described exemplary embodiments, but should be defined only in accordance with the following claims and their equivalents.

What is claimed is:

1. A computer-implemented method, comprising:
determining that an update to data on a local computer has been initiated by an application;
sending a first notification to a remote computer that the update has been initiated;
sending, to the remote computer, an indication of the data on the local computer being updated, wherein the indication is sent to the remote computer while the data on the local computer is being updated, wherein the indication is a separate item from the first notification to the remote computer, wherein the indication of the data on the local computer being updated is sent to the remote computer before the update of the data on the local computer is completed, wherein the indication of the data on the local computer being updated identifies which data set is being updated without including the exact updates where the update is not completed;
in response to determining that updates to the data on the local computer and meta data corresponding to the data have been completed, sending a second notification to the remote computer that the update has been completed, wherein the second notification identifies the data on the local computer which was updated; and
determining that a complete version of the updates to the data on the local computer and meta data corresponding to the data have been received at the remote computer, wherein the determination includes comparing information derived from the indication and the second notification, wherein the comparison enables detection of a mid-process version of the updates made on the local computer.

2. The computer-implemented method of claim 1, wherein the data on the local computer is asynchronously replicated on the remote computer.

3. The computer-implemented method of claim 1, wherein the determination that a complete version of the updates to the data on the local computer and the meta data corresponding to the data have been received at the remote computer comprises evaluating consistency points using at least the first notification and the second notification.

4. The computer-implemented method of claim 1, wherein the indication of the data on the local computer being updated is sent to the remote computer before the data on the local computer is updated, wherein the indication of the data on the local computer being updated identifies which data set is being updated before any updates are made to the local computer.

5. The computer-implemented method of claim 1, wherein the indication of the data on the local computer being updated is sent to the remote computer while the data on the local computer is being updated, wherein the indication of the data on the local computer being updated identifies which data set is being updated as the updates are made to the local computer.

6. The computer-implemented method of claim 1, wherein the first notification to the remote computer that the update to the data on the local computer has been initiated and the indication of the data on the local computer being updated are sent at substantially the same time.

7. A computer-implemented method, comprising:
receiving a first notification at a first computer that an update to data on a second computer has been initiated;
receiving, at the first computer, an indication of the data on the second computer being updated, wherein the indication is received at the first computer while the data on the second computer is being updated, wherein the indication is a separate item from the first notification, wherein the indication of the data on the second computer being updated is received by the first computer before the update of the data on the second computer is completed, wherein the indication of the data on the second computer being updated identifies which data set is being updated without including the exact updates where the update is not completed;
receiving a second notification at the first computer that updates to the data on the second computer and meta data corresponding to the data have been completed, wherein the second notification identifies the data on the second computer which was updated; and
determining that a complete version of the updates to the data on the second computer and meta data corresponding to the data have been received at the first computer, wherein the determination includes comparing information derived from the indication and the second notification, wherein the comparison enables detection of a mid-process version of the updates made on the second computer.

8. The computer-implemented method of claim 7, wherein the data on the second computer is asynchronously replicated on the first computer.

9. The computer-implemented method of claim 7, wherein the determination that a complete version of the updates to the data on the second computer and the meta data corresponding to the data have been received at the first computer comprises evaluating consistency points using at least the first notification and the second notification.

10. The computer-implemented method of claim 7, wherein the indication of the data on the second computer being updated is received by the first computer before the data on the second computer is updated, wherein the indication of the data on the second computer being updated identifies which data set is being updated before any updates are made to the second computer.

11. The computer-implemented method of claim 7, wherein the indication of the data on the second computer being updated identifies which data set is being updated as the updates are made to the second computer.

12. The computer-implemented method of claim 7, wherein the first notification to the first computer that the update to the data on the second computer has been initiated and the indication of the data on the second computer being updated are received at substantially the same time.

13. A computer program product for providing communication between local and remote computers, the computer program product comprising a computer readable storage medium having program instructions embodied therewith, the program instructions executable by a computer to cause the computer to:

determine, by the computer, that an update to data on a local computer has been initiated by an application;

send, by the computer while the data on the local computer is being updated, a first notification to a remote computer that the update has been initiated;

send, by the computer, to the remote computer, an indication of the data on the local computer being updated, wherein the indication of the data is a separate item from the first notification to the remote computer that the update has been initiated, wherein the indication of the data on the local computer being updated is sent to the remote computer before the update of the data on the local computer is completed, wherein the indication of the data on the local computer being updated identifies which data set is being updated without including the exact updates where the update is not completed;

in response to determining that updates to the data on the local computer and meta data corresponding to the data have been completed, send, by the computer, a second notification to the remote computer that the update has been completed, wherein the second notification identifies the data on the local computer which was updated; and determine, by the computer, that a complete version of the updates to the data on the local computer and meta data corresponding to the data have been received at the remote computer, wherein the determination includes comparing information derived from the indication and the second notification, wherein the comparison enables detection of a mid-process version of the updates made on the local computer.

14. The computer program product of claim 13, wherein the data on the local computer is asynchronously replicated on the remote computer.

15. The computer program product of claim 13, wherein the determination that a complete version of the updates to the data on the local computer and the meta data corresponding to the data have been received at the remote computer comprises evaluating consistency points using at least the first notification and the second notification.

16. The computer program product of claim 13, wherein the indication of the data on the local computer being updated is sent to the remote computer before the data on the local computer is updated, wherein the indication of the data on the local computer being updated identifies which data set is being updated before any updates are made to the local computer.

17. The computer-implemented method of claim 1, wherein the indication of the data on the local computer being updated identifies each data set being updated before the updates are made to the data set on the local computer.

* * * * *